United States Patent [19]

Wehde et al.

[11] 4,082,376
[45] Apr. 4, 1978

[54] BEARING ARRANGEMENT

[75] Inventors: Heinz Wehde, Rothenberg; Willi Becker, Braunfels, both of Germany

[73] Assignees: Arthur Pfeiffer Vakuumtechnik Wetzlar GmbH, Asslar; Teldix G.m.b.H., Heidelberg, both of Germany

[21] Appl. No.: 637,744

[22] Filed: Dec. 4, 1975

[30] Foreign Application Priority Data

Dec. 6, 1974 Germany ............................ 2457783

[51] Int. Cl.² ........................................... F16C 39/00
[52] U.S. Cl. ...................................................... 308/10
[58] Field of Search ............................ 308/10; 415/90

[56] References Cited

U.S. PATENT DOCUMENTS

| | | | |
|---|---|---|---|
| 3,473,852 | 10/1969 | Lyman | 308/10 |
| 3,490,816 | 1/1970 | Lyman | 308/10 |
| 3,493,275 | 2/1970 | Stone | 308/10 |
| 3,650,581 | 3/1972 | Boden | 308/10 |
| 3,698,775 | 10/1972 | Gilbert | 308/10 |
| 3,771,909 | 11/1973 | Rousseau | 308/10 |
| 3,780,593 | 12/1973 | Coleman | 308/10 |
| 3,791,704 | 2/1974 | Perper | 308/10 |
| 3,856,200 | 12/1974 | Lieb | 308/10 |
| 3,860,300 | 1/1975 | Lyman | 308/10 |
| 3,947,153 | 3/1976 | Matthias | 308/10 |

Primary Examiner—R. Skudy
Attorney, Agent, or Firm—Spencer & Kaye

[57] ABSTRACT

A magnetic bearing arrangement for a rotor rotating in a stator comprises a first magnetic bearing with at least one permanent magnet on the stator or rotor cooperating with component parts on the rotor or stator respectively composed, at least partially, of ferromagnetic and/or permanent magnetic material, a second magnetic bearing with at least one actively controlled electromagnet on the stator cooperating with component parts on the rotor respectively composed at least partially of ferromagnetic and/or permanent magnetic material, and a sensor for sensing the axial position of the rotor and at least one damping circuit for damping oscillations in a radial direction or about axes perpendicular to the axis of rotation of the rotor, the two magnetic bearings having a substantially co-axial construction to provide passive stabilization in a radial direction.

20 Claims, 2 Drawing Figures

BEARING ARRANGEMENT

BACKGROUND OF THE INVENTION

The invention relates to a magnetic bearing arrangement, particularly a bearing arrangement for a high-speed rotor. Such an arrangement may include two magnetic bearings which provide an axial tensioning force on the rotor, and with substantially coaxial construction of component parts provided respectively on rotor or stator they cause a passive stabilization in a radial direction. The rotor axis is preferable vertical.

Such a magnetic bearing arrangement is known from U.S. Pat. No. 3,473,852 in which two actively controlled, electromagnetic bearings are provided for axial stabilization of the rotor. These magnetic bearings include electromagnets with pole rings arranged on the stator, and ferromagnetic pole rings lying on the rotor adjacent to them. Because of the coaxial construction of the pole rings of rotor and stator, an uncontrolled passive stabilization is also achieved. The rigidity of this arrangement is however comparatively low in a radial direction or about axes perpendicular to the axis of rotation of the rotor, so that, when correspondingly loaded and, for example, resonant oscillations which occur when passing through critical rotary speed ranges may not be taken up by the magnetic bearing arrangement. Therefore, magnetic bearing arrangements have been proposed — for example in U.S. Pat. No. 3,650,581 — in order to provide actively controlled magnetic bearing systems for the axis of freedom. Such an arrangement is, however, very expensive in construction and manufacture and also requires considerable energy for producing the necessary bearing forces in all directions.

The invention seeks to reduce or avoid the above disadvantages and to create a magnetic bearing arrangement which is simple in construction and of favourable cost, which can ensure a suitably stable behavior of the rotor over all its intended rotational speed ranges. Moreover, the magnetic bearing arrangement is intended to be particularly applicable to vacuum technology, wherein, above all, electrical ducts, seals and the like should be avoided on the vacuum side.

SUMMARY OF THE INVENTION

According to the invention there is provided a magnetic bearing arrangement for a rotor rotating in a stator comprising a first magnetic bearing with at least one permanent magnet on the stator or rotor cooperating with component parts on the rotor or stator respectively composed, at least partially, of ferromagnetic and/or permanent magnetic material, a second magnetic bearing with at least one actively controlled electromagnet on the stator cooperating with component parts on the rotor respectively composed at least partially of ferromagnetic and/or permanent magnetic material, a sensor for sensing the axial position of the rotor and at least one damping circuit for damping oscillations in a radial direction or about axes perpendicular to the axis of rotation of the rotor, the two magnetic bearings have a substantially coaxial construction to provide passive stabilization in a radial direction.

The arrangement according to the invention contains a first uncontrolled and a second actively controlled magnetic bearing for axially stabilizing the rotor, wherein both bearings act to stabilize the rotor also in a radial direction because of the substantially coaxial construction of component parts, arranged appropriately on the rotor and stator. These component parts are preferably constructed as coaxial pole rings or edges, in order to achieve good radial rigidity. In addition, at least one preferably actively, controlled damping circuit is provided for damping oscillations. As a result, in an advantageous manner, the rotor may pass through the critical rotary speed ranges caused by natural resonance, without expensive active radial bearing systems being necessary to combat this, which systems have, in addition, a not inconsiderable energy requirement.

In a first embodiment, the magnetic bearings may have components arranged appropriately on the rotor made at least partially of ferromagnetic material and the components arranged appropriately on the stator may include a permanent magnet for the first magnetic bearing and an actively controlled electromagnet for the second magnetic bearing — the field of which may, if necessary, be superimposed on the field of a permanent magnet. As a result, axial tensioning forces can be exercised on the rotor in both magnetic bearings, which forces are opposite to one another. Instead of the said ferromagnetic components on the rotor or together with these components, permanent magnets may also be arranged on the rotor so that these provide and strengthen the bearing forces with appropriate polarization. The damping circuit may contain an electromagnetic control unit arranged on the stator, for example, an electromagnet with an E- or U-shaped core, a ferromagnetic ring on the rotor being adjacent the core. Furthermore, a sensor for the radial position or speed of the rotor is provided on the stator, wherein, either because of the geometric correlation to the control unit or through suitable electrical means, the necessary phase displacement between sensor signals and the electrical signals supplying the control unit is achieved, in order to attain the damping effect.

The construction of the damping circuit can be particularly simple, if the coil of the regulating unit and the coil of the inductive sensor, which preferably detects the speed of the rotor in a radial direction, are one and the same. If a two terminal network with negative internal resistance is connected at the outlet side of the coil, then the required damping effect can be achieved in a very simple manner. As an example for such a terminal network, a feedback amplifier may be used. It has proved, furthermore to be particularly advantageous to activate the damping circuit only in those frequency ranges in which mechanical resonance oscillations occur. For this, one or several filter networks are provided in the amplifier, which is connected at the output side of the sensor. These filter networks are so tuned that they only allow the particular frequency range associated with the mechanical oscillations of the rotor to pass through.

Instead of the electromagnetic control unit, an electrodynamic control unit may also be readily provided. The arrangement of the control units of the damping circuit or circuits is largely determined by the geometry of the rotor. In a rotor, which rotates about the axis of the largest moment of inertia, the radial oscillations which arise in critical rotary speeds may be effectively damped by damping circuits which are arranged in a radial plane. On the other hand, if, with an elongated rotor, for example, precession or nutation oscillations may be expected, then several damping circuits are preferably provided in different radial planes so that the rotor is also damped about axes perpendicular to the axis of rotation and is thereby stabilized.

According to a preferred embodiment, the bearing arrangement is provided in a turbo vacuum pump, or quite generally in technology, wherein the first passive magnetic bearing is arranged on the suction side (high vacuum) and the second actively controlled magnetic bearing and the damping circuit are arranged on the outlet side. As a result, in an advantageous manner, the otherwise usual problems of sealing may be avoided from the outset, since no electrical or other ducts are required for the high vacuum side. By using only one actively controlled electromagnet for stabilizing in an axial direction and one or several damping circuits in a radial direction, the production costs for electronics and electrical as well as magnetic means may be reduced to a minimum, and the power required may be held within limits which are economically justifiable. This is true particularly in comparison with arrangements which have completely actively controlled magnetic bearing systems also in a radial direction.

In a very advantageous further embodiment, it is proposed to combine together the electromagnet of the second magnetic bearing, the damping circuit and the driving motor into one sub-assembly, in order to be able to remove this from the pump without affecting the mechanical parts of the pump. This has proved to be of extraordinary importance, above all in manufacture and also for maintenance of the pump, because in this way the casing and the rotor may be mounted separately so that this sub-assembly can be connected just as easily to the pump casing. If, furthermore, the rotor is provided with a bell-shaped member into which the sub-assembly projects at least partially then, as a result, the length of the rotor may be reduced. This is of importance with respect to the stability of the rotor, since with it, the polar moment of inertia of the rotor is greater than the equatorial moment. The outer dimensions of the pump in an axial direction may also be considerably reduced in this way. Independently of this special arrangement, it is generally true for the rotor that it should be so dimensioned that its polar moment of inertia is greater than the equatorial moment.

BRIEF DESCRIPTION OF THE DRAWINGS

The invention will now be described in greater detail, by way of example, with reference to the drawing.

DESCRIPTION OF PREFERRED EMBODIMENTS

Figure 1:
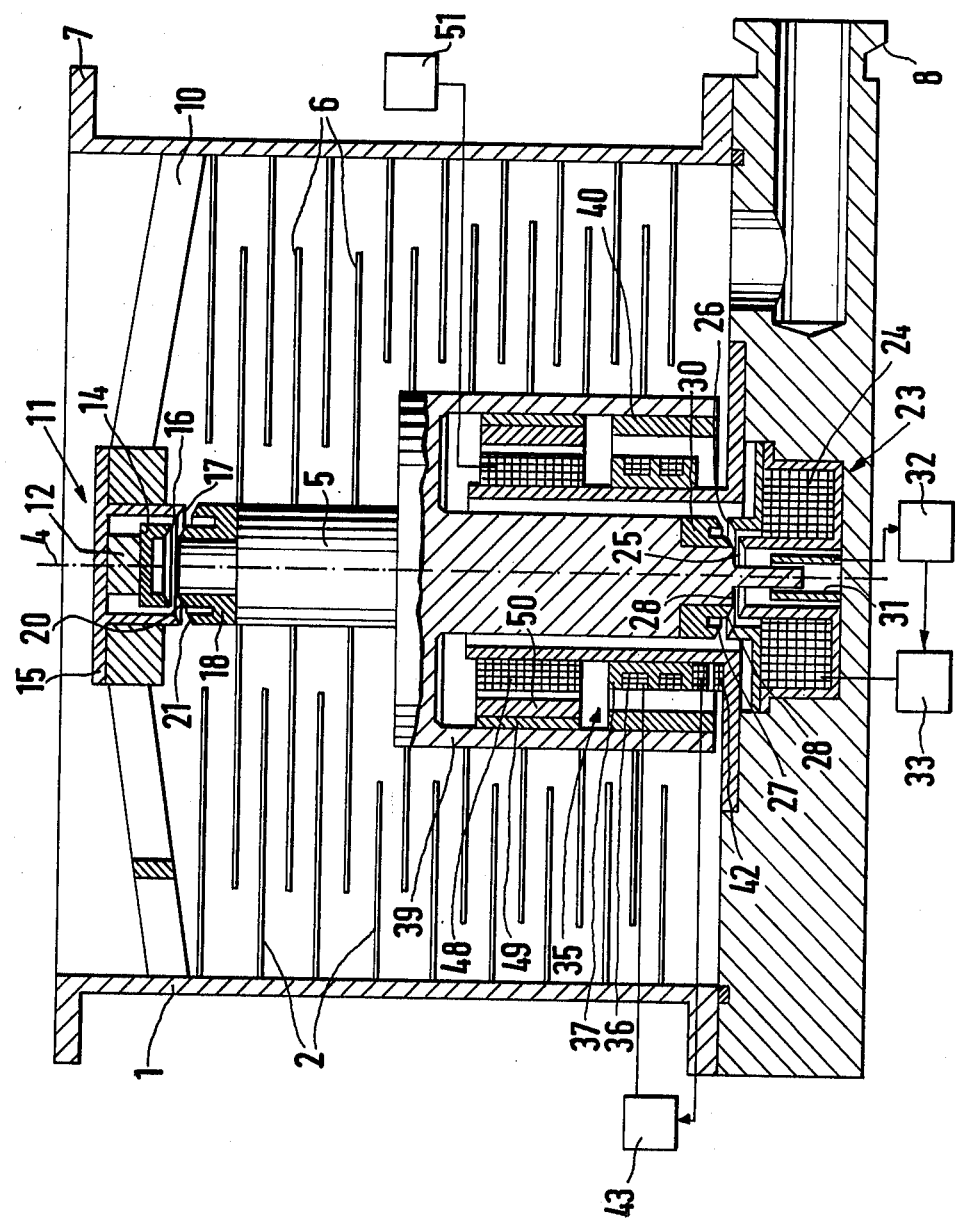
FIG. 1 shows, diagrammatically, a magnetic bearing arrangement, in accordance with the invention, in use in a turbo vacuum pump.

The turbo vacuum pump according to FIG. 1 of the drawing has a casing 1 with guide vane rings 2 arranged around the inside. It contains, furthermore, a rotor 5 rotatable about a rotational axis 4, on which rotor moving vane rings 6 are arranged such that they may pass appropriately between two guide vane rings. On the suction side of the pump (upper end in drawing), a flange 7 is provided by means of which connection can be made to an evacuable chamber. A further flange 8 is located on the outlet side of the pump for attachment of a vacuum backing pump. A first magnetic bearing 11, supported by means of radially directed supports 10, is provided in the centre of the opening on the suction side, by means of which bearing 11 an axially directed lifting force (upwards) is caused to act on the rotor 5. This magnetic bearing contains a permanent magnet 12 which is substantially axially magnetized and is arranged between approximately cup-shaped, components 14, 15 of ferromagnetic material provided with coaxial pole rings or edges 16, 17. A ferromagnetic component 18 is connected to the rotor, and this component has coaxial pole rings or edges 20, 21 such that these face the pole rings 16, 17. The magnetic bearing 11, which is characterized by a particularly simple design form, enables, simultaneously, radial stabilization of the rotor 5 because of the co-axial construction of the pole rings. Furthermore, according to another preferred embodiment, the said first magnetic bearing may be formed without components 14, 15. In this case, a preferably annular, axially magnetized permanent magnet is connected to the supports 10 and a further similarly constructed permanent magnet or a ferromagnetic component is positioned on the rotor to by axially opposite and adjacent to the permanent magnet.

At the lower end, a further magnetic bearing 23 is provided, which includes an actively controlled electromagnet 24 arranged on the stator. Coaxial pole rings 25, 26 are also provided here, and the rotor has a component 30 of ferromagnetic material with corresponding pole rings 27, 28 adjacent to the pole rings 25, 26. Furthermore, a sensor 31 is provided which detects the axial position of the rotor. This sensor preferably acts inductively, but may, if desired, act capacitatively or photoelectrically. The sensor is connected to a controller 32, the control characteristics of which are suitably chosen to achieve stabilization of the rotor in an axial direction by cooperation with an amplifier 33 connected between the electromagnet 24 and the output of the controller. A permanent magnet may also be provided on the rotor for the said second magnetic bearing, similarly to the first magnetic bearing.

Because of the form of the described magnetic bearings 11, 23, radial stabilization is achieved as well as axial stabilization. Since the rigidity of the bearing in a radial direction is comparatively small, at least one damping circuit 35 is provided in the region of the lower end of the rotor. The damping circuit comprises a coil 36 with an E-shaped core 37 arranged on the stator. The rotor has, in this region, a bell-shaped member 39, which is provided with a ring 40, made of ferromagnetic material, on the inside. Furthermore, an inductive sensor 42 for sensing the radial oscillation speed of the rotor is provided. In the drawing, the sensor 42 and the coil 36 acting as an electromagnetic control unit are located in the same axial plane, so that the phase displacement between sensor signal and electromagnetic force of the coil 36 necessary for damping, is carried out by means of the controller and amplifier 43. Obviously, both sensor and control unit may be circumferentially arranged at a prescribed angle. Furthermore, several such damping circuits may be distributed around the circumference of the rotor.

A brushless direct current motor with a winding 48 arranged on the stator is preferably provided for driving the rotor. This winding is located inside the bell-shaped rotor member 39, on the inside of which a magnetic return ring 49 and radially magnetized permanent magnets 50 are provided, adjacent permanent magnets being oppositely magnetized. The drive of the winding is effected in known manner by means of the control unit 51 which contains commutation electronics. The direct current motor may be formed in such a manner that practically no radial force components on to the rotor are present. Other electrical motors such as synchronous or asynchronous motors may be used as the drive mechanism if desired.

As can be seen from the drawing, the electromagnet 24 of the second magnetic bearing, the sensors 42 and coils 36 of the damping circuit, as well as the stator winding 48 of the drive motor, are constructed as a sub-assembly. This sub-assembly is located on the outlet side of the turbomolecular pump and may be readily removed from or connected to the pump. This is of special importance with respect to simplicity of manufacture or ease of maintenance of the pump. The subassembly, including stator winding, sensors and coils of the damping circuit, projects partially, into the bell-shaped rotor member 39.

Figure 2:
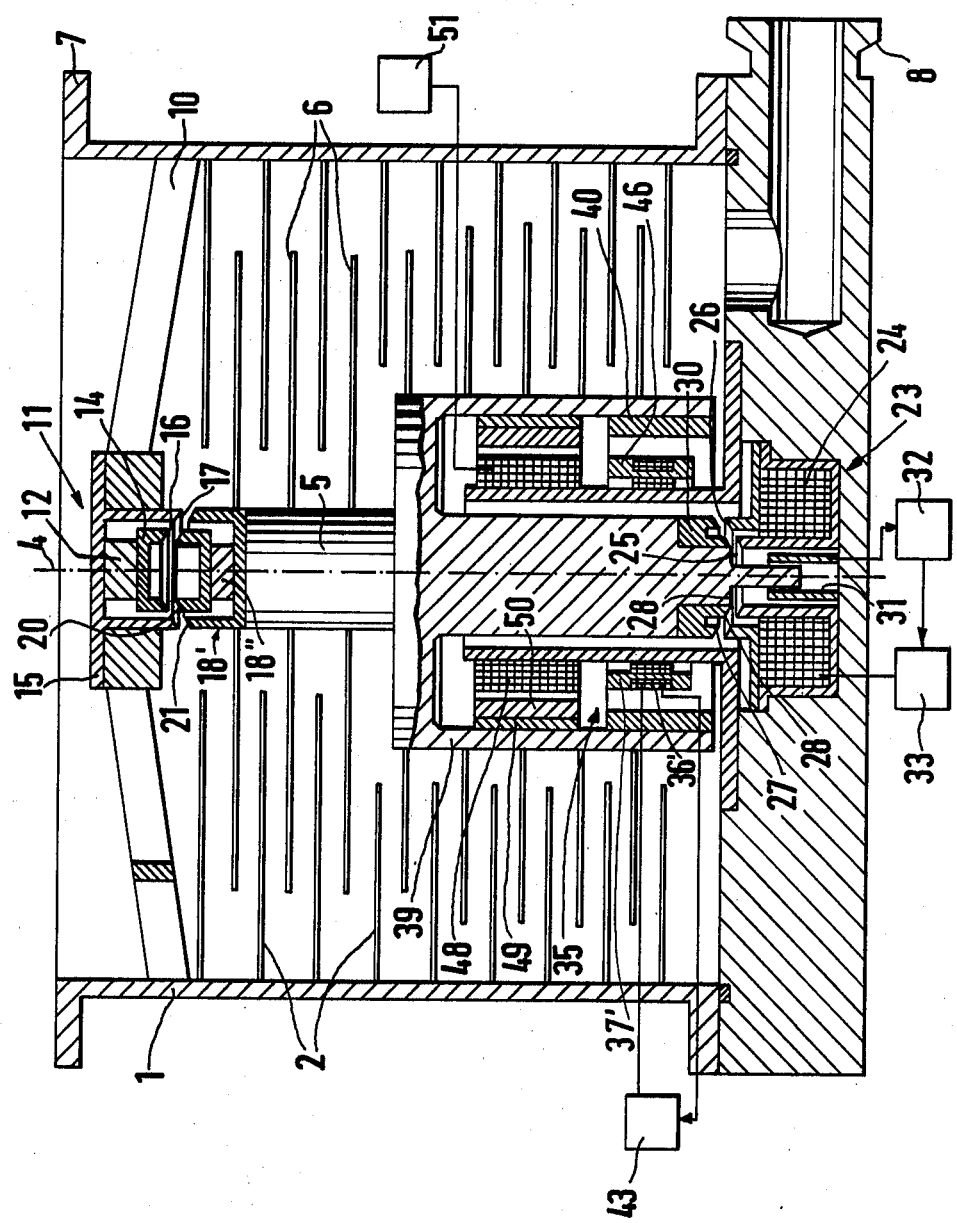
FIG. 2 a similar arrangement, differing only in some details.

In the embodiment of FIG. 2 the component 18' differs from that (18) of FIG. 1. Here also a permanent magnet 18" is provided on the rotor and the other parts of component 18' are formed in similar manner as parts 14 and 15. The polarity of the magnet 18" is such that tensioning forces between the stator and rotor are effective.

Furthermore in FIG. 2 the part 37' is U-shaped and the coil 36' is used here as inductive sensor and as damping coil. In controller 43 a network with negative internal resistance is provided and connected to the output of coil 36'. In this controller also filter networks are provided with such filter frequency ranges that the damping circuit is effective only when mechanical resonance oscillation of the rotor will occur.

What is claimed is:

1. A device comprising: a first member; a second member disposed for rotation within, and about an axis relative to, the first member; means defining an electric motor and rotating said second member and including a motor stator on said first member; a first magnetic bearing unit composed of at least one permanent magnet mounted on one of said members and a component part of the other of said members composed at least in part of ferromagnetic material and cooperating with said permanent magnet; a second magnetic bearing unit composed of at least one actively controlled electromagnet mounted on said first member and a component part of said second member composed at least in part of ferromagnetic material and cooperating with said electromagnet; said first and second magnetic bearing units providing axial tensioning forces for said second member and having a substantially coaxial configuration to effect passive stabilization in the radial direction; a sensor disposed for sensing the axial position of said second member relative to said first member and connected to control the axial force produced by said second magnetic bearing unit; damping circuit means disposed for damping oscillations of said second member in a radial direction and including a coil mounted on said first member; wherein said second member comprises a bell-shaped portion, and said second magnetic bearing unit, said sensor, said coil of said damping circuit means and said motor stator constitute a group of components extending at least partially into said bell-shaped portion.

2. An arrangement as claimed in claim 1, wherein said damping circuit is actively controlled.

3. An arrangement as claimed in claim 2, wherein said damping circuit comprises a control unit including said coil arranged on said first member, a component on said second member made of magnetic material and a sensor for sensing the radial position of said second member.

4. An arrangement as claimed in claim 2, wherein said damping circuit comprises a control unit including said coil arranged on said first member, a component on said second member made of magnetic material and a sensor for sensing the speed of rotation of said second member.

5. An arrangement as claimed in claim 3, wherein said coil has a U-shaped core.

6. An arrangement as claimed in claim 3, wherein said sensor of said damping circuit is an inductive sensor having a coil, and said coil of the control unit and said coil of said inductive sensor are provided by a single coil to which a two-terminal network with negative internal resistance is connected at the output side.

7. an arrangement as claimed in claim 3, wherein said control unit is an electromagnetically acting control unit.

8. An arrangement as claimed in claim 3, wherein said component on said second member is made of ferromagnetic material.

9. An arrangement as claimed in claim 3, wherein said component on said second member is made of permanent magnetic material.

10. An arrangement as claimed in claim 3, wherein said coil has an E-shaped core.

11. An arrangement as claimed in claim 1, wherein, for use in a turbo vacuum pump having a stator including said first member and a rotor including said second member, said first magnetic bearing unit is arranged on the suction side of the pump, with said permanent magnet connected to the casing of the pump and said group of components is arranged on the outlet side of the pump.

12. An arrangement as claimed in claim 11, wherein said group of components is constructed as a single sub-assembly, which may be removed from the casing of the pump without being dismantled and without engagement on to the rotor or stator of the pump.

13. An arrangement as claimed in claim 11, wherein said motor is constructed as a brushless direct current motor the permanent magnets of which are arranged on the inner side of said bell-shaped portion.

14. An arrangement as claimed in claim 11, wherein said first magnetic bearing unit is arranged substantially in the center of the opening on the suction side of the pump and is fastened to the casing of the pump by means of substantially radially directed supports.

15. An arrangement as claimed in claim 1, wherein said permanent magnet and said electromagnet are mounted on said first member.

16. An arrangement as claimed in claim 1, wherein said second member has a substantially vertical axis.

17. An arrangement as claimed in claim 1, wherein said damping circuit is effective in those frequency ranges in which mechanical resonance oscillations occur.

18. An arrangement as claimed in claim 1, wherein said motor is a brushless, ironless direct current motor.

19. An arrangement as claimed in claim 1, wherein the polar moment of inertia of said second member is greater than the equatorial moment of inertia.

20. An arrangement as claimed in claim 1, wherein said damping circuit means further acts for damping oscillations about axes perpendicular to the axis of rotation of said second member.

* * * * *